United States Patent
Brouwer et al.

(10) Patent No.: US 12,194,964 B2
(45) Date of Patent: Jan. 14, 2025

(54) CLEANING UNIT AND METHOD FOR CLEANING AN OPTICAL SENSOR DEVICE

(71) Applicant: MCi (Mirror Controls International) Netherlands B.V., Woerden (NL)

(72) Inventors: Stefan Fritz Brouwer, Schoonhoven (NL); Jannick Daniel Wijntjes, Rotterdam (NL); Meindert Jan Solkesz, Rotterdam (NL)

(73) Assignee: MCI (MIRROR CONTROLS INTERNATIONAL) NETHERLANDS, B.V. Woerden (NL)

( * ) Notice: Subject to any disclaimer, the term of this patent is extended or adjusted under 35 U.S.C. 154(b) by 237 days.

(21) Appl. No.: 17/636,552

(22) PCT Filed: Aug. 25, 2020

(86) PCT No.: PCT/NL2020/050525
§ 371 (c)(1),
(2) Date: Feb. 18, 2022

(87) PCT Pub. No.: WO2021/040517
PCT Pub. Date: Mar. 4, 2021

(65) Prior Publication Data
US 2022/0355766 A1     Nov. 10, 2022

(30) Foreign Application Priority Data

Aug. 27, 2019 (NL) .................................. 2023712

(51) Int. Cl.
*B60S 1/52* (2006.01)
*B60S 1/08* (2006.01)
*B60S 1/26* (2006.01)

(52) U.S. Cl.
CPC ................. *B60S 1/522* (2013.01); *B60S 1/08* (2013.01); *B60S 1/26* (2013.01)

(58) Field of Classification Search
None
See application file for complete search history.

(56) References Cited

U.S. PATENT DOCUMENTS

| 10,259,431 B1* | 4/2019 | Ybarra ................. B60S 1/566 |
| 2016/0315564 A1* | 10/2016 | Kotani ................. H02N 10/00 |

(Continued)

FOREIGN PATENT DOCUMENTS

| CN | 108349440 A | 7/2018 |
| CN | 108437935 A | 8/2018 |

(Continued)

*Primary Examiner* — Natasha N Campbell
*Assistant Examiner* — Pradhuman Parihar
(74) *Attorney, Agent, or Firm* — Volpe Koenig (57) ABSTRACT

A cleaning unit for cleaning a sensor window pane of an optical sensing device, in particular for optical distance measurement, more in particular a LiDAR sensor device, of a motor vehicle. The cleaning unit comprises a wiper. Further, the cleaning unit comprises a drive unit which is arranged for wiping the wiper over the sensor window pane. Advantageously, the cleaning unit can be arranged for wiping a first portion of the wiper, such as a first wiper tip, over the sensor window pane from a first position towards a second position to wipe at least a first portion of the sensor window pane located between said first and second positions. The cleaning unit can then also be arranged for moving the wiper back from said second position substantially towards said first position without said first portion of the wiper wiping over said first portion of the sensor window pane.

29 Claims, 8 Drawing Sheets

(56) References Cited

U.S. PATENT DOCUMENTS

| | | |
|---|---|---|
| 2017/0313288 A1 | 11/2017 | Tippy et al. |
| 2018/0215350 A1 | 8/2018 | Herrmann et al. |
| 2018/0272958 A1 | 9/2018 | Brouwer et al. |
| 2020/0023815 A1* | 1/2020 | Galera .................... B60S 1/522 |
| 2020/0216034 A1* | 7/2020 | Velasco .................. B60S 1/528 |

FOREIGN PATENT DOCUMENTS

| | | |
|---|---|---|
| CN | 109586502 A | 4/2019 |
| DE | 102005021672 A1 | 11/2006 |
| DE | 102017101641 A1 | 8/2018 |
| FR | 2831124 A1 | 4/2003 |
| GB | 466423 A | 5/1937 |
| JP | S56-134255 A | 10/1981 |
| JP | H5-65710 U | 8/1993 |
| JP | H06-179348 A | 6/1994 |
| JP | 2003341482 A | 12/2003 |
| JP | 5952472 B1 | 7/2016 |
| WO | 2017048126 A1 | 3/2017 |
| WO | 2017202562 A1 | 11/2017 |
| WO | 2019/097876 A1 | 5/2019 |

* cited by examiner

CLEANING UNIT AND METHOD FOR CLEANING AN OPTICAL SENSOR DEVICE

CROSS REFERENCE TO RELATED APPLICATIONS

This application is a 35 USC § 371 National Stage application of International Patent Application No. PCT/NL2020/050525, which was filed Aug. 25, 2020, entitled "CLEANING UNIT AND METHOD FOR CLEANING AN OPTICAL SENSOR DEVICE" and claims priority to Netherlands Patent Application No. 2023712, filed Aug. 27, 2019 and is incorporated herein by reference as if fully set forth.

The invention relates to a cleaning unit, in particular for cleaning of an optical sensing device. More particular, the invention relates to a cleaning unit for an optical distance measuring device, such as a LiDAR sensing device, of a motor vehicle.

Vehicles, manually operated, but also autonomous driving/autonomous cars, are equipped with various sensing devices, e.g. for generating a map of an environment of the vehicle. Typically, such vehicles are equipped with optical sensing devices for estimating distances between the vehicle and objects in the vehicle's environment, and/or relative velocities of said objects with respect to the vehicle. A particular kind of optical sensor technology employed is known as Lidar/LIDAR/LiDAR (LIght Detection And Ranging or Laser Imaging Detection And Ranging), also called LADAR (LAser Detection And Ranging) or 3D laser scanning.

Optical sensing device, such as optical distance measuring devices, particularly LiDAR sensing devices, may include one or more (laser) light sources for transmitting one or more (laser) light beams into the environment. One or more optical detectors are provided for detecting reflections of the transmitted one or more laser beams, wherein a processing unit may generate a mapping of the environment based on the transmitted and detected reflections of the light.

Further, the optical sensor devices comprise a sensor window pane which forms an outer face of the optical sensor device. The sensor window pane forms an optically transmissive protection layer for protecting vulnerable underlying sensor components. Light is thus transmitted and detected through the sensor window pane, and in order to obtain an unobstructed view of the environment, the optical sensing device is typically arranged on an outside of the vehicle, wherein the sensor window pane faces the environment, i.e. facing away from the vehicle.

Being at the outside of the vehicle, the sensing device, specifically the sensor window pane, is susceptible to collect impediments, such as (rain) droplets, particulates, bugs, etc., that could obstruct, deflect other otherwise interfere with the optical signals traveling across the sensor window pane, resulting in erroneous sensor data.

It is an aim of the invention to at least alleviate the above mentioned drawbacks. In particular, it is preferred to ameliorate sensor data of an optical sensor device of a motor vehicle. More particular, is preferred to minimize the collection and/or accumulation of optical impediments e.g. (rain) droplets, particulates, bugs, etc., on a sensor window pane of an optical sensing device.

According to a first aspect of the invention there is provided a cleaning unit for cleaning a sensor window pane of an optical sensing device, in particular for optical distance measurement, more in particular a LiDAR sensor device, of a motor vehicle, said cleaning unit comprising a wiper and a drive unit arranged for wiping the wiper over the sensor window pane. The wiper may preferably comprise and/or be formed by a wiper blade. The wiper, in particular the wiper blade, may be made of a material that is relatively flexible and/or relatively resilient with respect to the material of the window pane. For example, the wiper, in particular the wiper blade, may be a rubber or rubbery material. The sensor window pane may for example comprise an optically transmissive material, which is substantially smooth and/or homogeneous to avoid localized refractive index variations. The sensor window pane can for example be substantially flat, or alternatively curved in a desired shape, for example with a desired radius of curvature to optimize a viewing angle of the optical sensing device. A shape of the wiper, in particular of the wiper blade, can be arranged to correspond to the shape of the sensor window pane for optimal cleaning of the sensor window pane. The drive unit may for example drive the wiper over the sensor window pane along a predefined trajectory such that the wiper wipes substantially the whole sensor window pane.

In an embodiment of the cleaning unit, the wiper is arranged for wiping, pushing, sweeping and/or scraping water, other fluids, such as cleaning fluids or precipitation, and/or other impediments to light transmittance, away from at least a portion of the sensor window pane, said wiper preferably comprising a wiper blade. Said at least portion of the sensor window pane may be a portion of the pane that may define a field of vision of the optical sensing device. For example, the water and/or other impediments to light transmittance may for instance be wiped away from such field of vision defining portion of the sensor window pane towards a second portion at which it is not in the field of vision. During wiping of the sensor window pane, the wiper may be arranged to contact the sensor window pane, wherein a wiping movement induced by the drive unit wipes the wiper over the sensor window pane to remove fluids and/or particulates from the sensor window pane or at least from a respective portion thereof. The wiper may collect and remove various fluids from the sensor window pane, such as rain droplets and cleaning fluids or other detergents, antifreeze fluid, surfactants, but also particulates originating from insects, snow/hail, traffic debris, sand, bird droppings, etc.

In an embodiment, the wiper, in particular the wiper blade, may be driven by the drive unit over the sensor window pane in a direction substantially lateral to the wiper blade, in particular in a direction transverse to longitudinal direction of the wiper, especially the wiper blade, and/or a wiper tip of said wiper. In embodiments, the cleaning unit may be arranged to move the wiper, in particular the wiper blade, along a linear path along the sensor window pane when the wiper wipes the at least part of the sensor window pane. Alternatively or additionally, the wiper of the wiper blade may be moved differently, for instance the wiper or the wiper blade may be rotated, in particular about a rotation axis extending substantially transverse to the sensor window pane. Alternatively or additionally, the wiper or the wiper blade may be translated in order to move it along the sensor window pane. In particular, during the wiping, the wiper, especially the wiper blade, which may be linearly moved, rotated and/or translated, may be moved substantially perpendicular to its longitudinal direction.

For example, the wiper or the wiper blade, which may comprise a wiper body having a wiper tip to be in contact with the sensor window pane during wiping, may be substantially elongated in a longitudinal direction of the wiper blade, for instance for efficiently wiping the sensor window pane. Said wiper or wiper blade may in particular extend substantially rectilinearly. For example, the wiper blade may have blade length, in longitudinal direction of the wiper blade, which corresponds to a width of a field of vision defining portion of the sensor window pane and/or corresponds to a width of the sensor window pane to be cleaned in order to cover substantially said field of vision defining portion and/or substantially the whole sensor window pane with a single stroke of the wiper. Alternatively, the blade length of the wiper blade in longitudinal direction of the wiper blade may correspond to less than a width of the sensor window pane and/or may correspond to less than a width of the field of vision defining portion of said sensor window pane, for example about half the sensor window pane width and/or half of said field of vision defining portion thereof, to cover substantially the whole field of vision defining portion of the sensor window pane and/or substantially the whole sensor window pane with an outward and return movement of the wiper blade. In particular, the wiper blade may comprise a resilient wiper blade portion arranged for contacting the sensor window pane. This provides effective engagement between the wiper blade and the sensor window pane, while damage due to scratching of the wiper blade on the sensor window pane can be counteracted when the wiper moves along the sensor window pane. The resilient wiper blade portion may in particular comprise a rubber or rubber-like material, which is durable and easy to manufacture.

In another embodiment, the cleaning unit is arranged for wiping the wiper over the sensor window pane from a first position towards a second position such as to wipe at least a first portion of the sensor window pane located between said first position and said second position, and wherein the cleaning unit is arranged for moving the wiper back from said second position substantially towards said first position without wiping over said first portion of the sensor window pane. It was found that unidirectional wiping, e.g. wiping from the first to the second position and while refraining from wiping from the second substantially towards the first position, may give optimal cleaning results, in particular compared to bi-direction wiping. In particular, it is avoided that debris wiped off the sensor window pane on an outward wiping movement of the wiper from the first to the second position, is reintroduced onto the sensor window pane on a return movement of the wiper from the second position substantially towards the first position. Refraining from wiping on the return movement of the wiper from the second substantially towards the first position may also counteract a fluid film from being deployed onto the sensor window pane during the return movement. The wiper shape may be optimized to the direction of wiping, e.g. from the first to the second position. The wiper may be in contact with the sensor window pane while wiping from the first to the second position, wherein the wiper is disengaged from the sensor window pane during movement of the wiper from the second position substantially towards the first position. In particular, the drive unit is arranged for driving the wiper over the sensor window pane from the first to the second position, and back substantially towards the first position.

In further embodiments, the cleaning unit is arranged for moving the wiper back and forth between the first position and the second position, wherein the wiper is in contact with the sensor window pane when the wiper is moved from the first position towards the second position, and wherein the wiper is spaced away from the sensor window pane when the wiper is moved back from the second position towards the first position. A wiping cycle of an outward movement from the first to the second position followed by a return movement from the second to the first position, may for example be repeated multiple times to thoroughly clean the sensor window pane and wipe off debris that may have stuck to the sensor window pane. The cleaning unit may for example clean the sensor window pane in a predefined time slot, wherein during the time slot multiple wiping cycles are repeated. Such time slot may for instance be limited to 20 seconds, preferably at most 15 seconds, more preferably at most 10 seconds, even more preferably even less, for instance in order to counteract that the optical sensing device of the motor vehicle can not be used for a relatively long time. Particularly, the drive unit is arranged for moving the wiper back and forth between the first position and the second position, and to engage the wiper with the sensor window pane when moving the wiper from the first position towards the second position, and to disengage the wiper from the sensor window pane when moving the wiper back from the second position towards the first position. The drive unit may for example comprise an actuator coupled to a power supply, for example an electromotor such as a DC-motor. The actuator is mechanically or electromechanically coupled to the wiper by means of a coupling device. The coupling is configured such that the motion of the actuator is transferred to the wiper, for example from a rotational motion to a translational motion. The coupling device may further be configured for moving the wiper along a desired trajectory over the sensor window pane, and preferably to disengage the wiper from the sensor window pane at a return movement of the wiper. To this end, the coupling may for example comprise coupling arrangements, known to a skilled person, such as a spindle arrangement, a cam arrangement, belt drive, bar linkage, chain, guiding tracks etc.

In embodiments, the cleaning unit may comprise a second wiper, which for instance may be integrated with a first wiper and/or may be carried by a shared support, which first wiper wipes over the sensor window pane on an outward movement of the first and second wiper, whereas the second wiper wipes over the sensor window pane on a return movement of the first and second wiper. On the outward movement of the first and second wiper, the second wiper is disengaged and spaced away from the sensor window pane, whereas on the return movement of the first and second wiper, the first wiper is disengaged and space away from the sensor window pane. In this way, the sensor window pane is wiped on both the outward and the return movement of the wiper, while the first and second wiper wipe the sensor window pane unidirectionally.

In embodiments, the cleaning unit is arranged such as to wipe the wiper from the first position towards the second position in a first direction, and wherein the cleaning unit is arranged such as to move the wiper back from the second position towards the first position in a second direction which is substantially opposite to said first direction. An outward trajectory of the wiper from the first to the second position, and a return trajectory of the wiper from the second to the first position, may be adapted to the shape of the sensor window pane. The outward and return trajectory may substantially overlap, or may be substantially parallel to each other. With return of the wiper to an initial position, e.g. the first position, a wiping cycle can be obtained that can be repeated for effective cleaning of the sensor window pane. Optionally, the outward and/or return trajectory of the wiper is substantially linear. Alternatively, the outward and/or return trajectory of the wiper is substantially curved, such as arc-shaped, e.g. a pivoting wiper or wiper blade around a pivot axis. Optionally, the outward and/or return trajectory describe more complex shapes, such as an eccentric arc, that can be achieved by means of a bar linkage for instance.

In yet further embodiments, the cleaning unit is arranged for tilting at least a part of the wiper, for instance tilting at least a wiper blade of said wiper, preferably about a wiper axis extending substantially parallel to the sensor window pane and/or substantially in an longitudinal direction of the wiper or its wiper blade. In particular, the drive unit of the cleaning unit may be arranged for tilting at least a part of the wiper. Tilting of at least a part of the wiper enables energy efficient engaging and/or disengaging of the wiper from the sensor window pane, such that the wiper could contact the sensor window pane on an outward trajectory from the first to the second position, and could be spaced away from the sensor window pane on a return trajectory from the second to the first position. Moreover, a wiping angle of the wiper or wiper blade with respect to the sensor window pane can be controlled by tilting the wiper or wiper blade, to optimize cleaning performance.

In embodiments, the cleaning unit is arranged such that said at least part of the wiper is in a first orientation with respect to the sensor window pane when being moved from the first position towards the second position and in a second orientation with respect to the sensor window pane when moved back from the second position towards the first position, which second orientation is tilted with respect to said first orientation. Preferably, in the tilted or canted position of the wiper, the wiper does not contact the sensor window pane, when moving along a return trajectory between the second and first position. It is envisioned that in case the wiper comprises a first wiper and a second wiper, a tilting or canting movement of the wiper brings the first wiper in contact with the sensor window pane while disengaging the second wiper from the sensor window pane.

In further embodiments, the cleaning unit is arranged for retracting the wiper from the sensor window pane, said cleaning unit further being arranged to move the wiper from the second position back to the first position when the wiper is in a retracted state in which it is not in contact with the sensor window pane. Retraction of the wiper from the sensor window pane disengages the wiper from the sensor window pane to bring the wiper in a retracted state for being moved back to the first position. In particular the drive unit is arranged for retracting the wiper from the sensor window pane.

In embodiments, the cleaning unit is arranged to lift the wiper from the sensor window pane, in particular to retract the wiper in a direction at least partly transverse to the surface of the sensor window pane. For instance, the wiper may be lifted a distance above the sensor window pane at the second position, after which the wiper is moved substantially parallel to sensor window pane surface in a return movement of the wiper from the second to the first position. Said distance between the wiper and the sensor window pane is maintained during the return movement. For example, said distance between the wiper and the sensor window pane may be sustained substantially equal along the return movement. Alternatively, said distance between the wiper and the sensor window pane may be varying, such as describing an elliptical or arc-shaped function, along the return movement. At or near the first position, the wiper can be lowered to the sensor window pane to contact the sensor window pane, after which the wiper may be moved, by the drive unit, on an outward movement to the second position while contacting the sensor window pane. It is clear that, irrespective of a distance between the wiper and the sensor window pane, the wiper may follow various trajectories in a plane parallel to the sensor window pane.

In embodiments, the cleaning unit is arranged to retract the wiper in a direction at least partly in a direction substantially parallel to the face of the sensor window pane. For instance, the wiper may be retracted from the sensor window pane at an outer edge of the sensor window pane in order to return the wiper to an initial position, e.g. the first position, without contacting the sensor window pane. This way, the wiper can be moved outside a viewing field of the sensing device to reduce interference of the wiper with the sensing device when the wiper does not wipe the sensor window pane in a return movement. It minimizes down-time of the sensing device when cleaning of the sensor window pane since it enables the sensing device to acquire data directly after a wiping stroke, and in between subsequent wipe strokes. The wiper may for example be retracted from the sensor window pane in a direction of a longitudinal direction of the wiper to minimize spread-out of wiped-off debris. Optionally, the wiper is retracted from the sensor window pane at an outer edge of the sensor window pane in direction lateral to the wiper, i.e. in a direction transverse to a longitudinal direction of the wiper, in order to push wiped-off debris off the outer edge of the sensor window pane to be collected and discharged.

In further embodiments, the cleaning unit is arranged to move the retracted wiper back towards a location near the first position, preferably substantially without being in front of the sensor window pane.

In yet further embodiments, the cleaning unit further comprises one or multiple nozzles for spraying a cleaning fluid onto the sensor window pane. The cleaning fluid may facilitate efficient cleaning of the sensor window pane, with a minimal amount of wipes. The cleaning fluid may comprise a cleaning liquid, such as water, anti-freeze agents, detergents, solvents or combinations thereof. The cleaning unit may be provided with a pump, for applying the cleaning fluid under pressure onto the sensor window pane.

To minimize the amount of cleaning fluid sprayed onto the sensor window pane, the one or multiple nozzles may deposit a film of cleaning fluid onto the sensor window pane. Depositing the cleaning fluid on the sensor window pane may involve non-forcefully impacting the sensor window pane, enabling minimal usage of cleaning fluid. Using an impacting jet of cleaning fluid on the other hand, for mechanically removing impediments from the sensor window pane, requires abundant amounts of cleaning fluid. It is preferred to deposit a thin film of cleaning fluid onto the sensor window pane, covering the entire sensor window pane, prior to wiping the sensor window pane. The cleaning fluid can soak the sensor window pane, so as to loosen the impediments from the sensor window pane, wherein the wiper can subsequently mechanically remove the impediments from the sensor window pane, along with the deposited cleaning fluid.

The cleaning unit may be arranged to spray, in use with the nozzles, 2-20 mL of cleaning fluid onto the sensor window, particularly in a single wiping cycle. For efficient use of the cleaning fluid, it is preferred that substantially all of the released cleaning fluid is deposited on and adheres to the sensor window. The cleaning fluid deposited on the sensor window pane may soak the sensor window during a predetermined period of time, prior to wiping the sensor window with the wiper.

The cleaning unit may be arranged to intermit a movement of the wiper along the wiping trajectory for a predetermined soaking time, particularly after the cleaning fluid has been deposited on the sensor window pane. The predetermined soaking time can lie for example in a range of 0.2 to 8 seconds, particularly in a range of 0.5 to 2 seconds, such as about 1 second. The predetermined soaking time can occupy a substantial portion of an overall cycle time, which overall cycle time is defined as the time for the wiper to complete a single cycle of the wiper trajectory. For instance, the predetermined soaking time can be 10 to 50 percent, more particular 20 to 40 percent, such as about 25 percent of the overall cycle time. By allowing the cleaning fluid to soak the sensor window pane during the soaking time period, impediments are easily removable from the sensor window by the wiper. It moreover allows for minimal usage of cleaning fluid as the cleaning fluid need not be used for mechanically removing impediments from the sensor window pane.

In order to avoid disturbance of the spray of the nozzles caused by wind, such as wind apparent wind of a driving a vehicle which could divert the spray of cleaning fluid away from the sensor window pane and/or reduce a force impact of the cleaning fluid on the sensor window pane, in some embodiments of the cleaning unit, the one or more nozzles, at least when said one or more nozzles are in a spraying state in which the one or more nozzles spray cleaning fluid onto the sensor window pane, are directed towards said sensor window pane. Preferably, the nozzles are arranged to direct, in said spraying state, the cleaning fluid in a direction perpendicular to the sensor window pane. This minimizes the spraying distance between the one or more nozzles and the sensor window pane, thereby keeping disturbances to the spraying to a minimum.

In further embodiments, the one or more nozzles are provided on the wiper and/or on a wiper support carrying the wiper. This way, a compact cleaning unit can be obtained. Also, the application of cleaning fluid on the sensor window pane and the wiping of the wiper can be efficiently coordinated, to minimize cleaning time of the cleaning unit. Moreover, the amount of sprayed cleaning fluid can be reduced. A further advantage may lie in that a single drive and/or single actuator (preferably an electric actuator, such as a DC-motor) can be used to move both the wiper and the one or more nozzle. As such, the drive unit of the cleaning unit may be arranged to drive the wiper as well as the one or more nozzles.

The system can particularly comprise an array of nozzles which array extends linearly across the sensor window pane in a first direction, wherein the cleaning unit is arranged to drive the array of nozzles over the sensor window pane in a second direction, perpendicular to the first direction, so as to deposit a film of cleaning fluid on the sensor window in a scanning motion. The array of nozzles for example comprises 5 to 20 nozzles per 100 mm length of the array, preferably about 10 to 15 nozzles per 100 mm length of the array. The nozzles may be linearly and equidistantly arranged in a row.

The array of nozzles can be driven parallel to the sensor window pane, for depositing a uniform film of cleaning fluid over the sensor window pane. Also, it is preferred that the system is arranged to drive the array of nozzles at a substantially constant velocity over the sensor window, at least while depositing the cleaning fluid.

To prevent that cleaning fluid is blown away from the sensor window pane before it hits the sensor window pane, when the sensing device is provided on a moving vehicle for example, and/or to prevent that cleaning fluid blows off the sensor window pane before it is wiped by the wiper, embodiments of the cleaning unit further comprise a movable cover for covering at least a portion of the sensor window pane, said cover being movable relative to the sensor window pane. Preferably, the nozzles are provided, at least in a spraying state of the nozzles, between the cover and the sensor window pane. Optionally, the movable cover is configured to cover substantially the whole sensor window pane, in a spraying state of the nozzles. The drive unit of the cleaning unit may be arranged to drive the cover. Preferably, the cleaning unit is arranged to withdraw, for example with the drive unit, the cover from a viewing field of the sensing device after the sensor window pane has been cleaned.

In embodiments of cleaning unit, the one or more nozzles are provided on the cover, enabling actuation of the one or more nozzles and the cover by a single actuator. Preferably, the nozzles are provided, at least in a spraying state of the nozzles, between the cover and the sensor window pane, such that the cover shields the spraying nozzles and at least a part of the sensor window pane from the (apparent) wind.

In further embodiments of the cleaning unit, the movable cover includes the wiper and/or a wiper support supporting the wiper, and/or the movable cover is carried on the wiper and/or a wiper support supporting the wiper. The cover and the wiper may be actuated by a single actuator. The wiper or wiper blade can be mounted onto, or can be integrated with, the movable cover. The wiper or wiper blade may be mounted directly or indirectly onto said movable cover. In other words, the movable cover can form at least a part of a wiper support for the wiper. Alternatively, the wiper (support) is not included in the movable cover, and the movable cover can be moved independent from the wiper (support).

Embodiments of the cleaning unit are arranged such that the wiper or the wiper support can be moved along at least a part the sensor window pane by moving the cover along the sensor window pane.

In embodiments, the movable cover is provided with a guide arranged for guiding the wiper or the wiper blade along the sensor window pane. The guide may include one or more guiding channels, and/or guiding tracks. It will be appreciated that in other embodiments, both embodiments with and embodiments without a movable cover, one or more other parts or elements of the cleaning unit may be provided with a guide arranged for guiding the wiper or the wiper blade along the sensor window pane.

In embodiments of the cleaning unit, said cleaning unit is arranged to move the wiper independent from moving the movable cover and/or is arranged to move the movable cover independent from moving the wiper. For example, the wiper may be moved whenever the cover is moved, but the wiper may also be moved individually, i.e. without moving the cover.

In embodiments of the cleaning unit, the drive unit arranged for wiping the wiper over the sensor window pane is also arranged for moving the movable cover, in particular from a first cover position in which the movable cover covers at least a part of the sensor window pane towards a second cover position in which the cover substantially leaves free the at least part of the sensor window pane. In addition, the drive unit may be arranged for moving the movable cover from the second cover position in which the cover substantially leaves free the at least part of the sensor window pane, towards the first cover position in which the movable cover covers at least a part of the sensor window pane. It is preferred that the drive unit is arranged to withdraw the cover from a viewing field of the sensing device, when the sensor window pane is not cleaned.

In embodiments of the cleaning unit, the drive unit comprises a rotatable drive gear, preferably drivable by means of an electric motor, wherein the wiper is mechanically coupled to said rotatable drive gear such as to drive the wiper when said drive gear is rotated, and wherein the cover is coupled to said the rotatable drive gear by means of a slip coupling, wherein the cleaning unit is arranged such that when the rotatable drive gear is rotated in a first rotational direction, the drive unit drives the movable cover from the second cover position to the first cover position wherein the cleaning unit comprises a first stop surface for cooperation with the cover to prevent the cover from moving beyond said first cover position when being moved from the second cover position to first cover position, and the cleaning unit is arranged such that when the rotatable drive gear is kept rotating in said first rotational direction when the movable cover has reached its first cover position and is being stopped by said first stop surface, the slip coupling allows the rotatable drive gears to keep driving the wiper while the cover is kept in the first cover position by means of the first stop surface, and wherein the cleaning unit is arranged such that when the rotatable drive gear is being rotated in the second rotational direction, when the cover is in its first cover position, the drive unit drives the movable cover from said first position to the second cover position. By driving the motor/gear in the opposite direction, said motor/gear may allow to drive the wiper to wipe the sensor window pane when the cover is in its second position, i.e. not covering the sensor window pane. This may for instance be advantageous for wiping off condense or rain drops, for example by using the same motor/gear, without the need to close off the sensor window pane by the cover. Hence, cleaning time may be minimized, as the cover does not need to be employed. Besides, it is to be noted that, in alternative embodiments, the cover may be positioned in a different position in which the cover is withdrawn from a viewing field of the sensing device.

In an embodiment, the movable cover is rollable, in particular such as to be arranged to be rolled up about a rolling axis. Thereto, the cover may be flexible and/or may include multiple cover segment that are pivotable connected to each other such as to form a rollable cover. Alternatively or additionally, the cover is foldable and/or slidably arranged in the cleaning unit.

In a second aspect of the invention, there is provided an assembly, comprising an optical sensing device, in particular for optical distance measurement, more in particular a Lidar sensor device, the assembly further comprising a cleaning unit according to the first aspect of the invention.

In a third aspect of the invention, there is provided a motor vehicle, in particular a car, provided with a cleaning unit according to the first aspect or an assembly according to the second aspect of the invention.

In a fourth aspect of the invention, there is provided a method for cleaning a sensor window pane of an optical sensing device, in particular wherein the optical sensing device is an optical distance measuring device and/or is arranged to sense optical data for an optical distance measuring device, more in particular a LiDAR sensor device, of a motor vehicle, comprising a step of wiping at least a first portion of the sensor window pane by means of a wiper.

In an embodiment of the method according to the fourth aspect of the invention, the wiper is first wiped over the sensor window pane along a first movement route, wherein the wiper is then returned substantially to a first position where the first movement route started, wherein the wiper is not wiping over the sensor window pane when being returned substantially to said first position, preferably wherein the wiper is then again wiped over the sensor window pane, in particular along a movement route substantially corresponding with the first movement route.

The various aspects of the invention and embodiments thereof will now be discussed in conjunction with drawing. In the drawings.

FIGS. 1A-I schematically show a sensor window pane 1 provided with one or more wipers 3 of a cleaning unit in exemplary configurations with respect to the sensor window pane 1 as well as with exemplary trajectories of the one or more wipers 3 over the sensor window pane 3. In each of FIGS. 1A-I, a wiper 3 is moved by a driving unit (not shown) from a first position 7 to a second position 9 on an outward movement of the wiper 3. The wiper 3 is subsequently moved from the second 9 to the first 7 position on a return movement of the wiper 3. During the outward movement of the wiper 3 from the first 7 to the second 9 position, the wiper wipes over the sensor window pane 1 to clean the sensor window pane 1 form debris as is indicated by the solid arrows. At the second position 9, the wiper 3 is disengaged from the sensor window pane, for example by lifting the wiper a distance above the sensor window pane, and during the return movement back to the first position 7, the wiper 3 remains disengaged from the sensor window pane, i.e. the wiper 3 does not contact the sensor window pane 1, to prevent reintroduction of the debris wiped off by the wiper 3. The return movement of the wiper 3 is indicated with a dashed arrow in FIGS. 1F and 1H. The outward and return movement of the wiper 3, may substantially differ, but may also overlap.

Figure 1A:
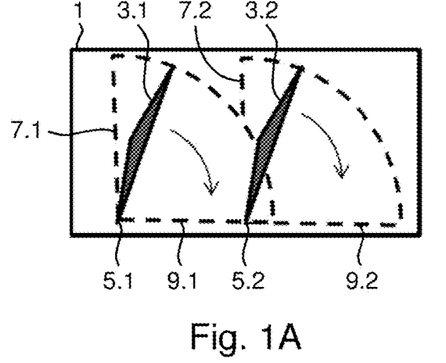
FIGS. 1A-I show several schematic wiping trajectories of the wiper over a sensor window pane.
Figure 1B:
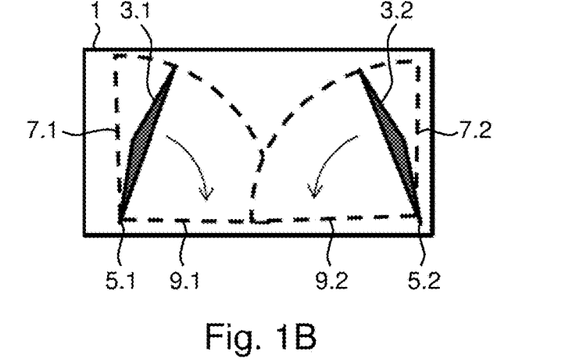

FIGS. 1A-D show configurations of a pivoting wiper 3 at a pivoting axis 5. It is preferred that the wiper 3 wipes the sensor window pane 1 unidirectional, i.e. that the wiper 3 contacts the sensor window pane 1 on an outward movement of the wiper 3 from a first position 7 to a second position 9, and does not contact the sensor window pane 1 on a return movement of the wiper 3 from the second position 9 back to the first position 7. FIGS. 1A-B show a configuration with two wipers 3.1, 3.2, wherein each wiper 3.1, 3.2 is moved, by a drive unit (not shown) from a respective first positions 7.1, 7.2 to a second positions 9.1, 9.2 while wiping over the sensor window pane 1. At the second positions 9.1, 9.2 the wipers 3.1, 3.2 are disengaged from the sensor window pane, for example lifted a distance above the sensor window pane 1, and moved back to their respective first positions 7.1, 7.2. The wipers 3.1, 3.2 may be driven by a single actuator, such as a DC-motor, or alternatively by two respective actuators. It is clear that the cleaning unit may comprise more than three wipers, for example three or four wipers, in similar or alternative configurations.

Figure 1C:
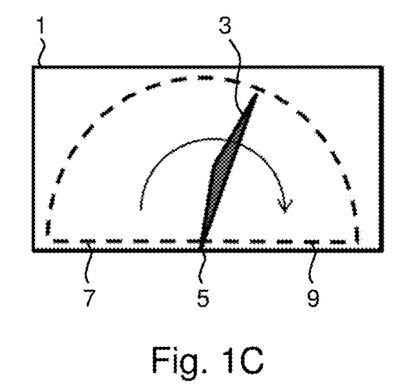
Figure 1D:
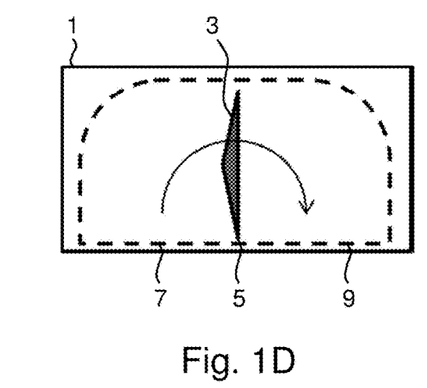

FIGS. 1C-D show a configuration with one wiper 3, which is pivoted back and forth at a pivot axis 5 between a first and second position. The trajectory of the wiper shown in FIG. 1D is substantially eccentric arc-shaped to maximize the coverage of the wiper 3 on the sensor window pane 1. Such eccentric arc shape, or other desired shape, may be accomplished by a dedicated mechanism coupled to an actuator of the wiper 3, for example a bar linkage arrangement.

Figure 1E:
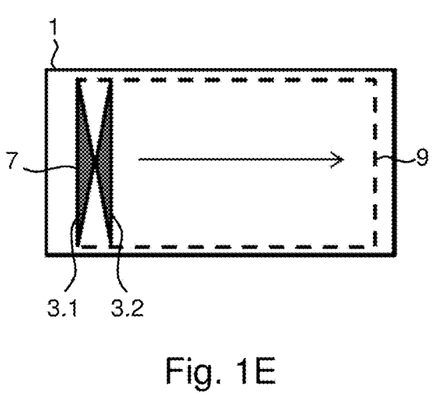
Figure 1F:
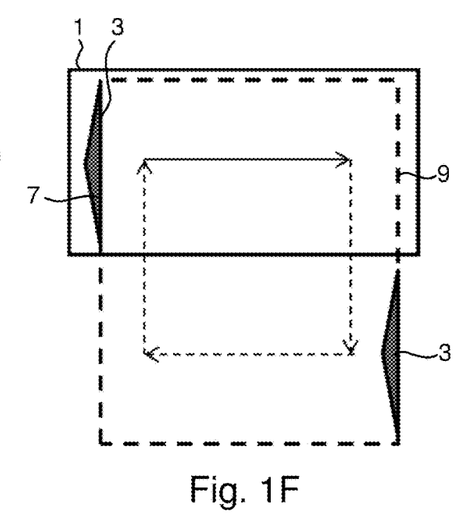
Figure 1G:
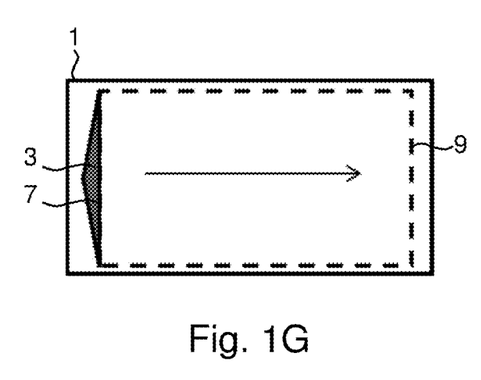
Figure 1H:
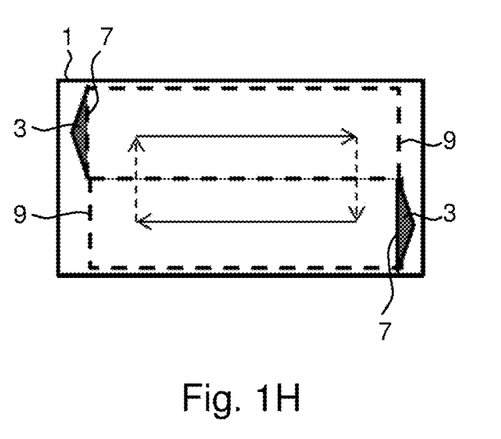

FIGS. 1E-I show a configuration wherein the wiper 3 is moved along a linear path from the first position 7 to the second position 9. FIG. 1E shows a configuration with two wipers 3.1, 3.2 sharing a wiper support. Each wiper 3.1, 3.2 is a directional wiper, such that a first wiper 3.1 contacts the sensor window pane 1 and a second wiper 3.2 does not contact the sensor window pane 1 during an outward movement from the first 7 to the second position 9. Similarly, the second wiper 3.2 contacts the wiper during a return movement from the second 9 to the first 7 position while the first wiper 3.1 does not contact the sensor window pane 1. In FIG. 1F, the wiper 3 is retracted from the sensor window pane 1 in a direction at least partly in a direction substantially parallel to the sensor window pane 1. In particular, the wiper 3 is retracted in a longitudinal direction of the wiper 3. The wiper 3 can in this way be returned to the first position 7 outside a viewing field of the sensor device. The return path from the second 9 to the first 7 position is indicated by the dashed arrows. During the return movement, the wiper 3 does not wipe the sensor window pane 1. However, in alternative embodiments, the wiper may return otherwise, for instance at the rear side of the sensor device, such that it then also may return outside the viewing field of the sensor device. There may be two or more wipers provided, that follow the same or similar trajectory as shown in FIG. 1F. FIG. 1H shows a similar configuration compared to FIG. 1F, but wherein the wiper 3 is not retracted from the sensor window pane 1. At the second position 9, the wiper in FIG. 1H is inversed, such that a first portion of the sensor window pane is wiped on the outward movement, and the and a remaining portion is wiped on the return movement of the wiper 3. The wiper 3 thus wipes over the sensor window pane 1 during the outward as well as during the return movement as is indicated by the solid arrows. For example, the wiper 3 may have length dimension such that substantially the whole sensor window pane 1 is wiped in a single wiping cycle, i.e. on the outward and return movement. For example, the wiper 3 may have a length dimension, in longitudinal direction of the wiper 3, that corresponds to about half, or more than half, a width of the sensor window pane 1. There may be two or more wipers provided, that follow the same or similar trajectory as shown in FIG. 1H.

FIG. 1G shows a configuration wherein the wiper 3 is moved along a linear path from the first position 7 to the second position 9, in particular from one lateral side to the other, e.g. from the left side to the right side or from the right side to the left side.

Figure 1I:
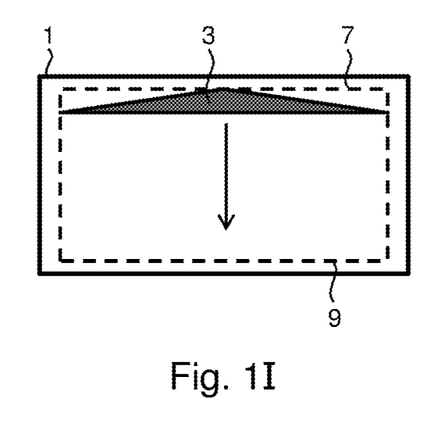

Like FIG. 1G, also FIG. 1I shows a configuration wherein the wiper 3 is moved along a linear path from the first position 7 to the second position 9. As can be seen here in the exemplary embodiment of FIG. 1I, the sensor window pane 1 may be of substantially elongate or oblong design, in particular of elongate rectangular design, more in particular having its length extending substantially in the horizontal direction. The sensor window pane 1, which preferably may be a substantially flat sensor window pane, may be extending substantially upright, in particular substantially vertically, and may for instance be provide at a front side of a motor vehicle, such as for instance a car, truck, or bush. Additionally or alternatively, the wiper 3, which may comprises a substantially elongate wiper blade, may extend substantially parallel with the length direction of the sensor window pane 1 and/or substantially horizontally. The cleaning unit may then be arranged for wiping a first portion of the wiper 3, such as for instance a first wiper tip of the wiper blade of the wiper 3, over the sensor window pane 1 from a first position 7, preferably a top position, towards a second position 9, preferably a bottom position, such as to wipe at least a first portion of the sensor window pane 1 located between said first position 7 and said second position 9.

In embodiments, the cleaning unit may then be arranged for moving the wiper 3 back from said second position 9 substantially towards said first position 7 without said first portion of the wiper 3 wiping over said first portion of the sensor window pane 1. However, in alternative embodiments, said first portion of the wiper may stay in contact with the sensor window pane 1 when the wiper 3 is moved back to the first position 7, and may in such embodiments thus wipe the sensor window pane 1 both when moving the wiper 3 down, as well as when moving the wiper 3 back up to said first position 7.

Although such a configuration of FIG. 1I may require a relatively large wiper and/or wiper blade with respect to the configuration of FIG. 1G, an advantage may lie in that the sensor window pane, or the respective portion thereof to be cleaned, can be cleaned relatively swiftly when the wiper 3 extends substantially parallel to the length direction of an oblong sensor window pane. This can facilitate that the sensor is only blocked relatively briefly. Additionally or alternatively, wiping in a downward direction may facilitate that water, dirt and/or the like can be removed relatively efficiently.

The arrangement in each of FIGS. 1A-I may be provided with one or more nozzles for applying a cleaning fluid onto the sensor window pane 1. Cleaning fluid may for example include water, detergents, anti-freeze agents, or a combination thereof. The one or more nozzles may be integrated with the wiper 3, for example sharing a support. It is preferred to spray the cleaning fluid in a direction substantially perpendicular to the sensor window pane 1. To prevent cleaning fluid from blowing away due to driving induced wind before it reaches the sensor window pane 1, and/or to avoid that the cleaning fluid blows off the sensor window pane 1 before the wiper 3 is able to wipe, the one or more nozzles may be shielded with a cover. The cover and the nozzles are preferably movably arranged to be withdrawn from a viewing field of the sensor device. The cover may be arranged to completely cover the sensor window pane, or may cover a portion where the nozzles are actively spraying cleaning fluid. In a configuration, the wiper 3, one or more nozzles, and a cover are integrated, for example sharing a support, wherein the one or more nozzles apply cleaning fluid on the sensor window pane 1, whilst being shielded by the cover. The one or more nozzles are in this configuration preferably arranged to spray the cleaning fluid on the outward movement of the wiper ahead of the wiper, such that the wiper wipes the cleaning fluid together with other debris, off the sensor window pane 1. The cleaning unit may for example comprise two nozzles, or three nozzles or four or five or even more, such as for instance about ten, about twenty or about thirty nozzles, which may be distributed substantially evenly with respect to the wiper and/or with respect to the sensor window pane. The cleaning unit may further comprise a cleaning fluid container for holding an amount of cleaning fluid. The cleaning unit may for example be arranged to recycle cleaning fluid that has been deployed and wiped off the sensor window pane. The wiper may be shaped to collect the applied cleaning fluid, for example pushing it to an edge of the sensor window pane, for instance where a gutter or drain is provided to collect the cleaning fluid. A filtration device may be employed or filtering the cleaning fluid to separate the cleaning fluid from the debris of sensor window pane. The collected cleaning fluid may be reintroduced directly from the gutter or drain or filtration device onto the sensor window pane, or may stored in the cleaning fluid container.

Figure 2:
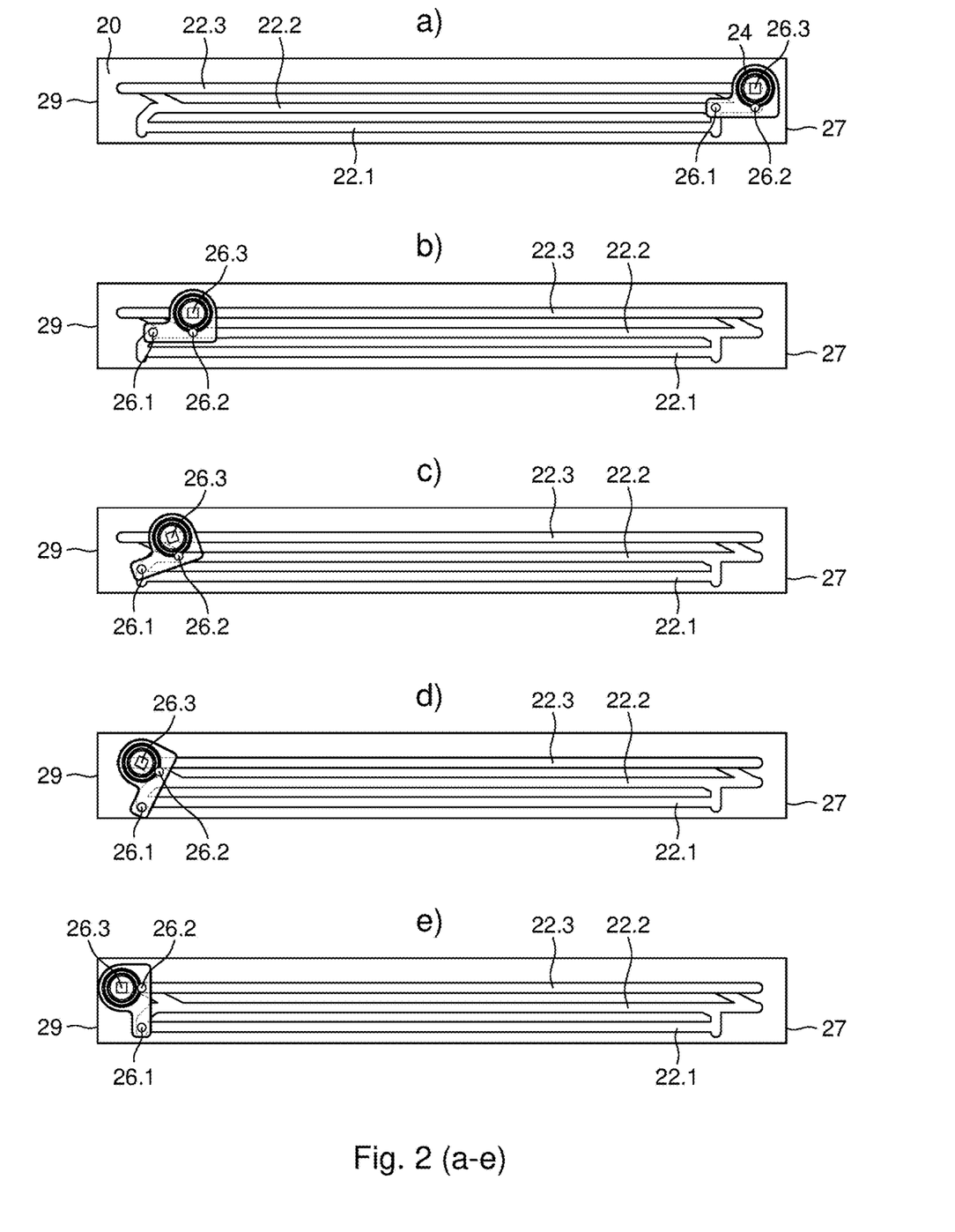
FIG. 2 shows a schematic depicting ten different instances a)-j) of at least a part of a drive unit for a cleaning unit configured for unidirectional wiping of a sensor window pane.

FIG. 2 shows an embodiment of a guide for guiding one or more wipers, nozzles, covers, or combinations thereof along a linear path over the sensor window pane 1. The guide forms a frame 20 or housing 20 defining one or more guiding tracks 22.$i$, in particular a groove structure, for guiding a connection piece 24 along the linear path. Connected to the connection piece 24 is a wiper, cover, and/or nozzle, which for clarity reasons are not depicted in FIG. 2. The housing forms three guiding tracks 22.1, 22.2 and 22.3, which extend parallel to each other in a longitudinal direction of the housing. The housing 20 is arranged adjacent the sensor window pane 1 in such a way that the guiding tracks 22.$i$ extend in a direction parallel to the sensor window pane 1. The connection piece 24 comprises guiding pins 26.1, 26.2 which are provided in the guiding tracks 22.$i$. In use, the connection piece 24 is driven by a drive unit and guided from a first end 27 to the second end 29 of the housing 20. A wiper connected to the connection piece 24 can as such be moved over the sensor window pane from a first position to a second position, which first and second position correspond to the first 27 and second end 29 of the housing 20.

At either end, the guiding tracks 22.$i$, are connected to each other such that the pins 26.1, 26.2 can change tracks at the first and/or second end of the housing. This allows for tilting and/or retracting of the wiper from the sensor window pane to prevent the wiper from contacting the sensor window pane on a return movement from the second end 29 to the first end 27.

The guiding means are arranged to translate the connection piece 24 between the first 27 and second 29 end of the housing, and to tilt or rotate the connection piece 24 at the first 27 and second 29 end for engaging and disengaging the wiper with/from the sensor window pane. In particular, the guiding means are arranged to rotate the connection piece 24 around a rotation axis 26.3. The rotation axis 26.3 may be a virtual axis, or may comprise a axle body. Optionally, the axle body may arranged to act as a third guiding pin, to be guided in the guiding tracks 22.$i$.

The connection piece 24 particularly comprises a rotational two guiding pins 26.1, 26.2. The rotation axis 26.3 and guiding pins 26.1, 26.2 are mutually arranged in such a way that virtual lines connecting the rotation axis and pins with each other enclose a right triangle. More specifically, the pins are arranged such that a virtual line between the first 26.1 and second 26.2 pin is perpendicular to a virtual line between the rotation axis 26.3 and the second pin 26.2.

Further, the guiding means are arranged such that the distance between the first pin 26.1 and a second pin 26.2 corresponds to a distance between a first 22.1 and third track 22.3. This way, the first pin 26.1 and the second pin 26.2 can be guided through the first 22.1 and third 22.3 track respectively while the rotation axis 26.3 also travels along the third track 22.3. Also, a distance between the second pin 26.2 and the rotation axis 26.3 corresponds to a distance between the first track 22.1 and a second track 22.2. This way, the second pin 26.2 as well as the first pin 26.1 can be guided in the second track 22.2 while the rotation axis 26.3 can travel along the third track 22.3. In this arrangement of pins 26.1, 26.2 and tracks 22.$i$, the connection piece 24 may be returned from the second end 29 to the first end 27 in a tilted or canted orientation with respect to the outward orientation from the first 27 to the second 29 end, while the rotation axis 26.3 translates linearly between the first 27 and second 29 end along the third track.

Various instances in the movement of the connection piece 24 along the housing 20 is schematically depicted in FIG. 2. In particular, in instance a) the connection piece 24 is at the first end 27 of the housing 20. Both pins 26.1, 26.2 are in the second track 22.2, and the rotational axis 26.3 is at the third 22.3 track. In this orientation of the connection piece 24 the wiper extends substantially perpendicular to the tracks 22.$i$ in a direction away from the housing. The connection piece 24 is driven and guided from the first end 27 to the second end 29 of the housing.

In instances b) to e), when the connection piece 24 approaches the second end 29, the leading first pin 26.1 abuts an inclined surface of the end stop of the second track 22.2, which inclined surface guides the first pin to change tracks from the second 22.2 to the first 22.1 track. Consequently, a rotational motion of the connection piece 24 is induced, in which the second pin 26.2 is forced to change tracks from the second 22.2 to the third 22.3 track. The rotational axis 26.3 remains at the third track 22.3. The wiper being connected to the connection piece 24 also rotates along with connection piece 24 such that the wiper no longer contacts the sensor window pane.

In instance e), in which the connection piece 24 has reached the end position, i.e. the rotation axis 26.3 has reached the end point at the second end 29 of the housing, the connection piece 24 has been rotated about 90 degrees from the orientation as seen in instance a) and b). Also at instance e), a drive direction of the connection piece 24 is reversed to drive the connection piece back towards the first end 27. The drive direction may be reversed in several ways. For example, the drive direction of an actuator, e.g. an electromotor, may be reversed, by means of a mechanical or electromechanical switch, or a mechanism may be coupled to an actuator, such as a bar linkage arrangement, to revert the drive direction of the connection piece 24.

At instance f) the connection piece 24 is driven towards the first end 27. When the connection piece 24 approaches the first end 27 in instances g) to i), the first pin 26.1 hits an end stop of the first track 22.1 thereby inducing a rotational movement of the connection piece 24 that forces the second pin 26.2 to change tracks from the third 22.3 to the second track 22.2. Continued motion of the connection piece towards the first end 27 forces the first pin 26.1 to change tracks from the first 22.1 to the second 22.2 track. The rotation axis 26.3 remains in the third track 22.3. The wiper being connected to the connection piece, is rotated along with the connection piece 24 to re-engage with the sensor window pane. The rotational movement of the connection piece 24 is completed in instance j) which completes the cycle. At instance j), the wiper is reoriented perpendicular to the tracks 22.$i$ in a direction away from the housing, and the drive direction of the connection piece is again reversed, to drive the connection piece 24 to the second end while wiping the sensor window pane.

FIGS. 3A-D show partly cut-way views of an embodiment of a cleaning unit 10 for cleaning a sensor window pane 1 of an optical sensing device 11. The cleaning unit 10 comprises a wiper 3, including a wiper blade 30, which can be moved back and forth along a sensor window pane 1 by means of drive unit, which is not shown. The drive unit, which for instance may comprise and/or be formed by an electric motor, may be arranged to move, for instance via a drive train, one or more wiper carriers 4 which carry the wiper 3. For example, the wiper or wiper blade may be of elongate design and its distal end, and preferably both its distal end its proximal end, may be supported by a respective carrier 4. Here, the cleaning unit 10 is arranged to move the carrier 4, and the thereto attached wiper 3, in a substantially straight longitudinal direction D1, D2, but in alternative embodiments the wiper 3 may be moved differently, for instance by, alternatively or additionally, rotating and/or translating it.

Figure 3A:
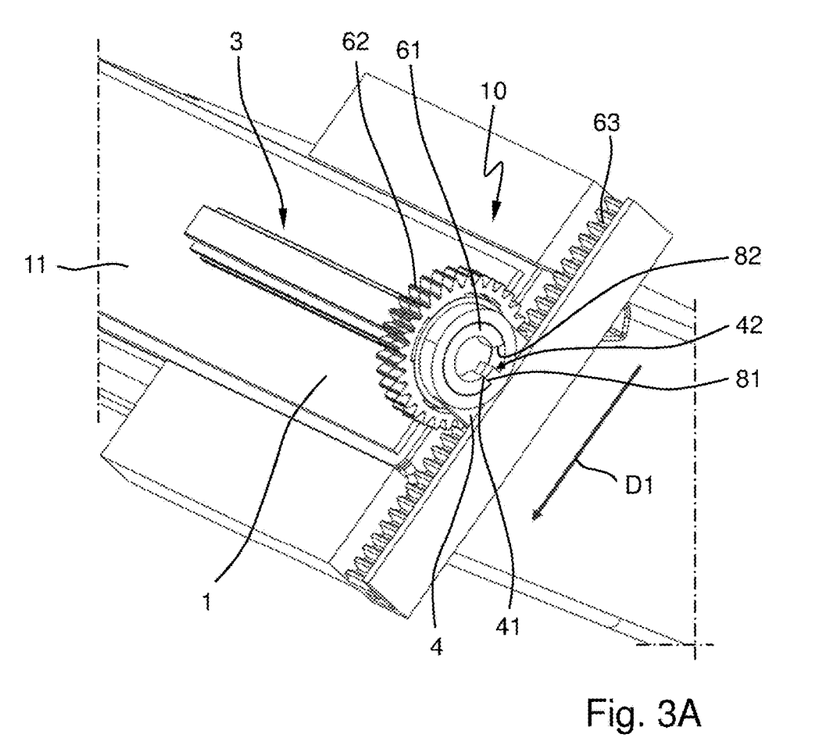
FIGS. 3A-F show several schematic, partly cut-away perspective and exploded views of an embodiment of cleaning unit according to an aspect of the invention.
Figure 3B:
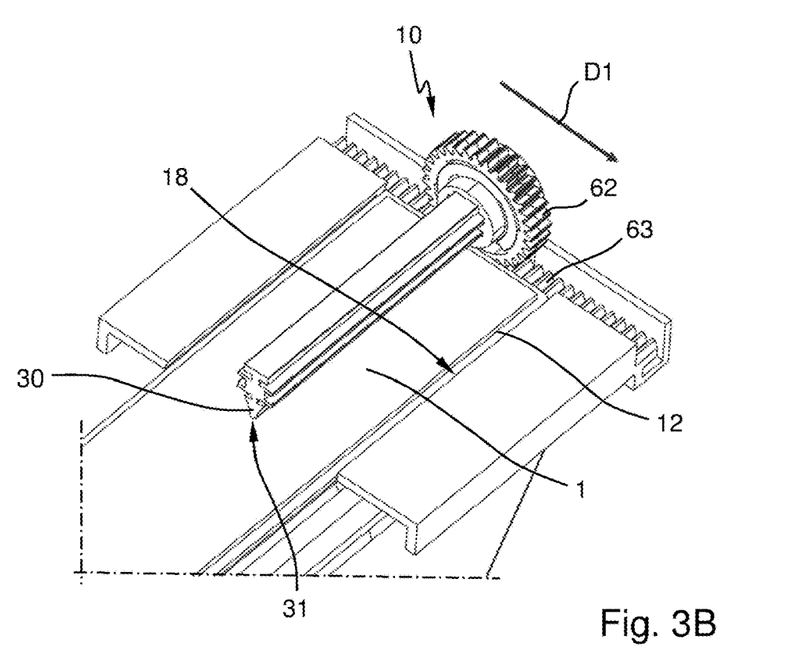
Figure 3C:
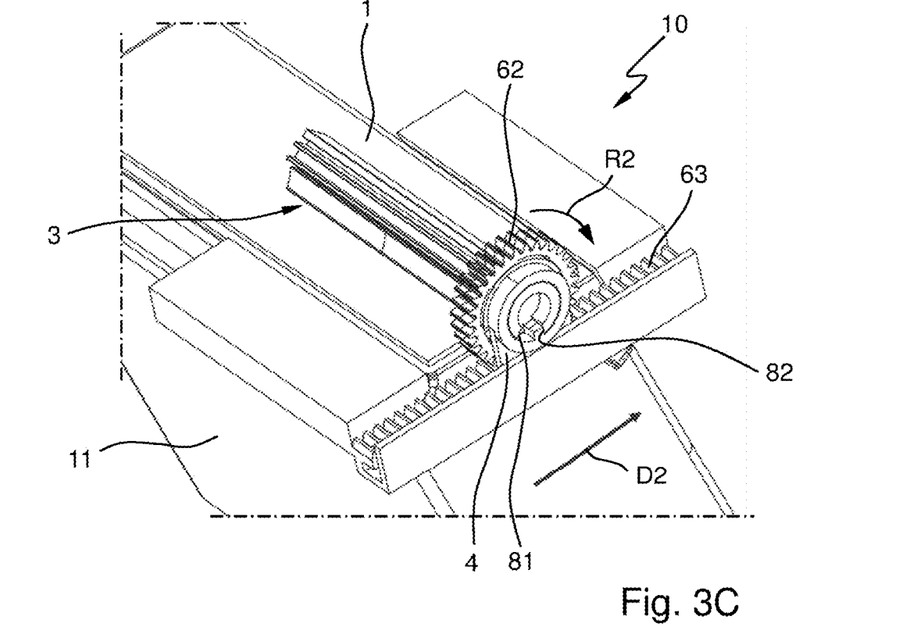
Figure 3D:
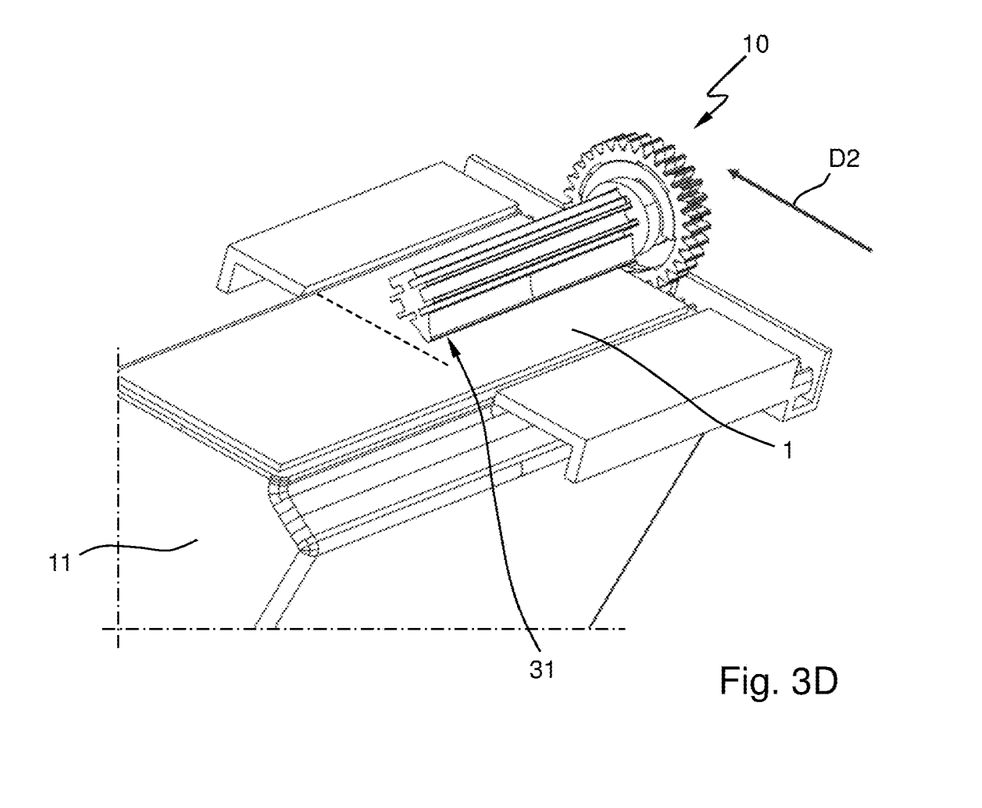
Figure 3E:
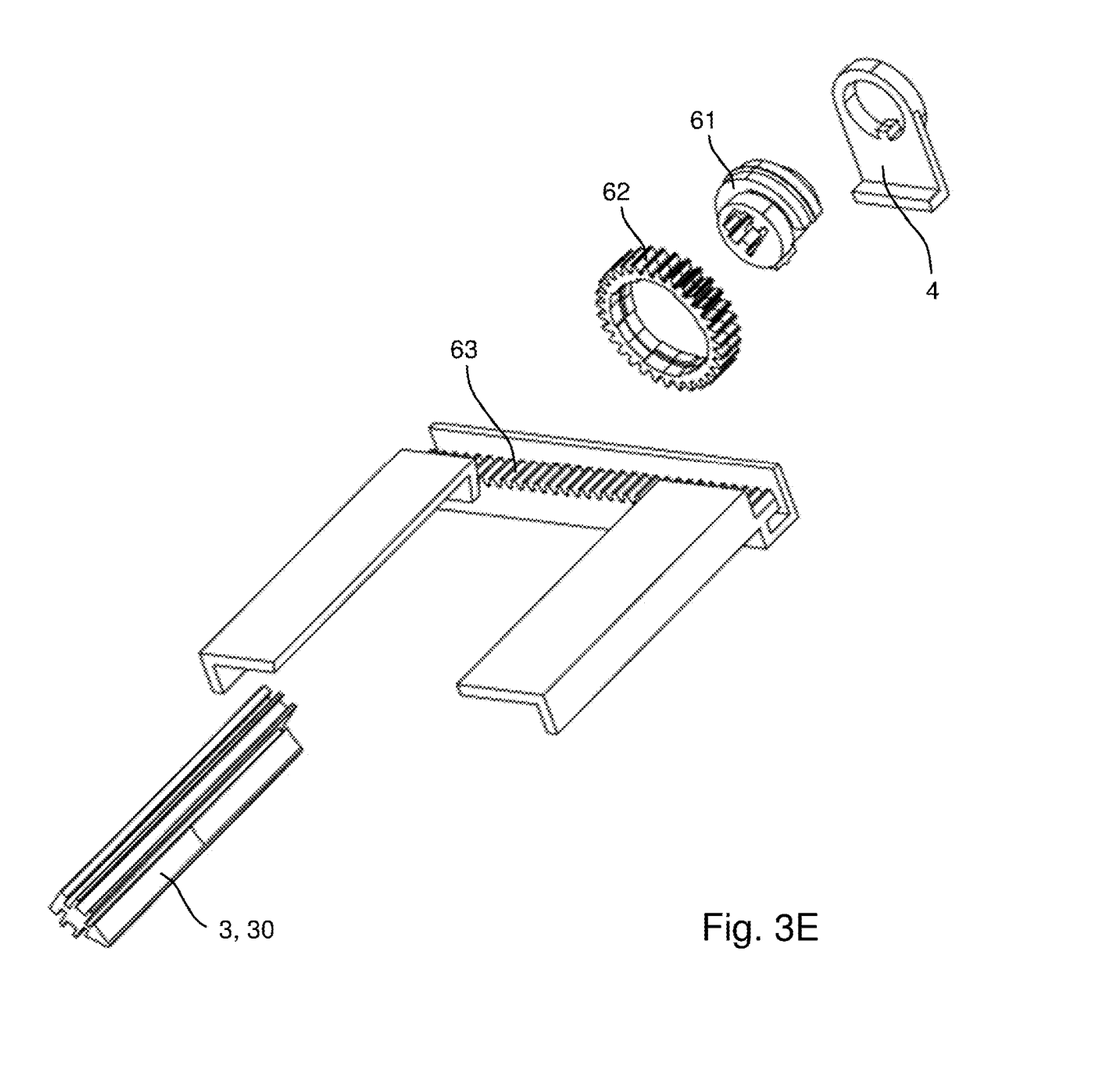
Figure 3F:
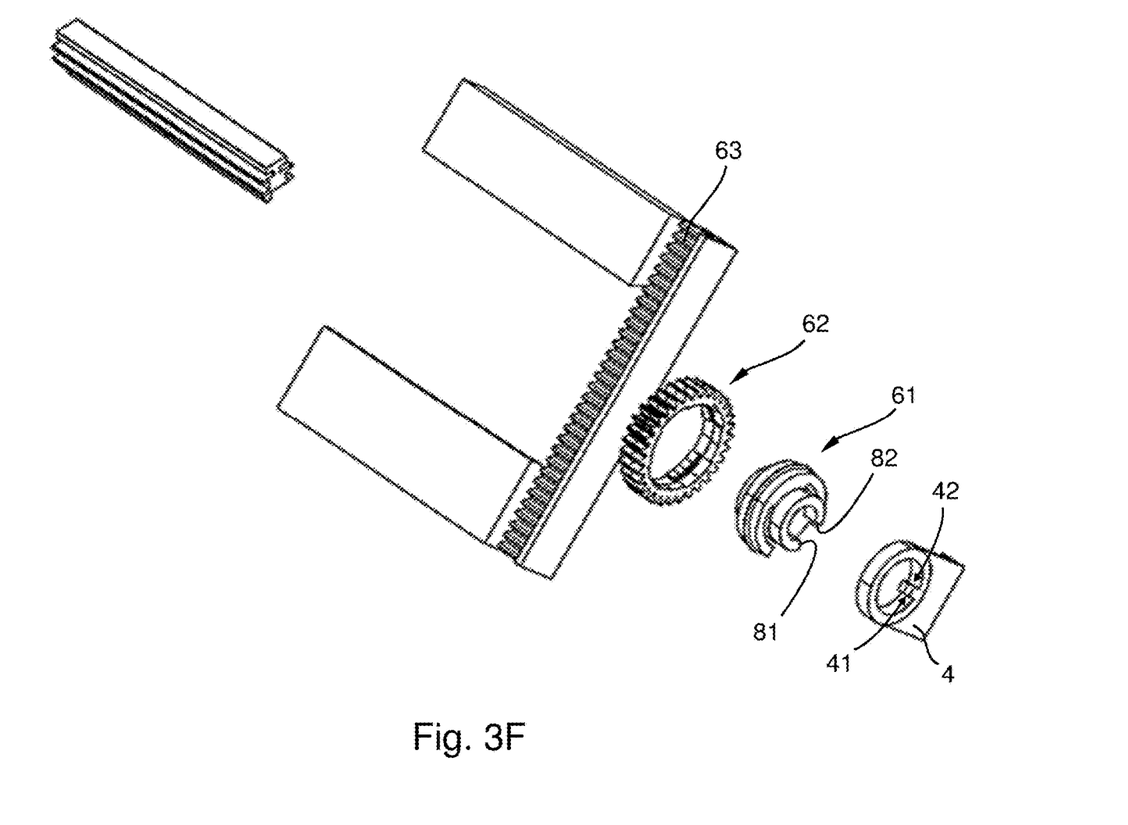

FIGS. 3E-F show partly-cut away exploded views of the embodiment of the cleaning unit 10 shown in FIGS. 3A-D. As can be seen relatively well in FIG. 3E, the carrier 4 may be formed as a sliding carriage or the like, but may nevertheless be formed otherwise in alternative embodiments. The wiper 3 or the wiper blade 30 is here mounted in the carrier 4 such as to be rotatable to a certain extent. In particular, the wiper blade 30 can be fixed to a wiper holder 61 which can be mounted at least partly rotatably to the carrier 4.

As can be seen in FIGS. 3A-B, when the carrier 4 is moved along the sensor window pane 1, a first portion of the wiper 3, which may be formed by a wiper blade 30, more in particular a wiper tip 31 thereof, is in contact with and pushed over at least a first portion of the sensor window pane 1 in order to wipe clean said at least first portion. For example, water and/or other impediments to light transmittance may then be pushed off the sensor window pane 1, or at least off the at least first portion, or area, which may define a field of vision of the optical sensing device 11, for instance by pushing it off an outer edge 12 of the sensor window pane 1 and/or by pushing it into a discharge channel 18 or gutter 18 or the like.

During use, after the wiper 3 has been moved from an initial, first position towards a second position, for instance located at, near or beyond said outer edge 12, the wiper 3 can be moved back from said second position substantially towards said first position without said first portion of the wiper 3 being in contact with and wiping over said first portion of the sensor window pane 1. For example, before moving the wiper 3 back along said first sensor window pane 1, said wiper 3 may be tilted about its elongated axis in order to lift it and/or its first portion from the sensor window pane 1. In the shown embodiment, the wiper 3 is thereto provided with a tilting mechanism, which here includes a gear 62 attached to the wiper 3 via the wiper holder 61. Said gear 62 is attached to the wiper holder 61 by means of a slip coupling. When the drive unit moves the wiper carrier 4 back in the reverse direction D2, the gear 62, which forms a pinion engaging a rack 63, is forced to rotated by said rack 63. The slip coupling causes the holder 61 and therefore the wiper 3 to rotate along with said gear 62, thereby lifting the first portion of the wiper, which may be formed by the wiper tip 31, from the sensor window pane 1, such that said first portion of the wiper is spaced away from the sensor window pane 1 when the wiper 3 is moved back from the second position towards the first position.

As can be seen relatively well in FIGS. 3A, 3C and 3F, in the present embodiment, the wiper 3 is provided with a first stop 81, which here is formed and defined by the wiper holder 61, but which alternatively may for instance be an integral part of the wiper 3 and/or the wiper blade 30. When the wiper 3 is moved in the first direction D1 and is wiping the respective portion of the sensor window pane 1, said first stop 81 abuts a first corresponding stop 41 provided at the carrier 4, thereby preventing the wiper 3 from rotation, while the slip coupling allows that the gear 62 can keep rolling along the rack 63. When the wiper 3 moves back in the reverse direction D2, the gear 62, which is made to rotate by the rack 63, will make the holder 61 and the wiper 3 rotate in a rotational direction R2 until a second stop 82 provided at the wiper 3, e.g. formed by the wiper holder 61, abuts a second corresponding stop 42 provided a the carrier 4, thereby preventing the wiper 3 from rotating further and thereby keeping the first portion of the wiper spaced away from the sensor window pane 1 when the wiper 3 is moved back in said reverse direction D2.

Here, a single wiper 3 formed by a single wiper blade 30 is provided. However, in alternative embodiments, a second wiper may be provided, which may define a second wiper portion, in particular formed by and/or provided with a second wiper tip, which may be in contact with the sensor window pane 1 when the first wiper portion, when spaced apart from said sensor window pane 1, moves back in the reverse direction D2. In turn, said second wiper portion may be spaced apart, in particular lifted, from said sensor window pane 1 when the wiper 3, or a first wiper, moves from the first position towards the second position while the first wiper portion is wiping the at least first portion of the sensor window pane 1. Thereto, the first and the second wipers, which may both extend in the same or a parallel longitudinal direction, may with respect to each other for instance be provided under an angle when seen in such longitudinal direction.

It is noted that for the purpose of clarity and a concise description features are described herein as part of the same or separate embodiments, however, it will be appreciated that the scope of the invention may include embodiments having combinations of all or some of the features described. Further, it is noted that the invention is not restricted to the embodiments described herein. It will be understood that many variants are possible. Such variants will be apparent for the person skilled in the art and are considered to lie within the scope of the invention as formulated in the following claims.

The invention claimed is:

1. A cleaning unit for cleaning a sensor window pane of an optical sensing device, of a motor vehicle, said cleaning unit comprising a wiper and a drive unit arranged for wiping the wiper over the sensor window pane, wherein the cleaning unit is arranged for wiping a first portion of the wiper over the sensor window pane from a first position towards a second position to wipe at least a first portion of the sensor window pane located between said first position and said second position, and wherein the cleaning unit is arranged for moving the wiper back from said second position towards said first position without said first portion of the wiper wiping over said first portion of the sensor window pane.

2. The cleaning unit according to claim 1, wherein the wiper is arranged for pushing water, other fluid, and/or other impediments to light transmittance, away from at least a portion of the sensor window pane.

3. The cleaning unit according to claim 1, wherein the cleaning unit is arranged for moving the wiper back and forth between the first position and the second position, wherein said first portion of the wiper is in contact with the sensor window pane when the wiper is moved from the first position towards the second position, and wherein said first portion of the wiper is spaced away from the sensor window pane when the wiper is moved back from the second position towards the first position.

4. The cleaning unit according to claim 1, wherein the cleaning unit is arranged to wipe the wiper from the first position towards the second position in a first direction, and wherein the cleaning unit is arranged to move the wiper back from the second position towards the first position in a second direction which is opposite to said first direction.

5. The cleaning unit according to claim 1,
wherein the wiper comprises a second wiper portion,
and wherein the cleaning unit is arranged for moving the wiper from the first position towards the second position without said second portion of the wiper wiping over said first portion of the sensor window pane.

6. The cleaning unit according to claim 1, wherein the cleaning unit is arranged for tilting at least a part of the wiper.

7. The cleaning unit according to claim 1,
wherein the cleaning unit is arranged for tilting at least a part of the wiper, and
wherein the cleaning unit is arranged such that said at least part of the wiper is in a first orientation with respect to the sensor window pane when being moved from the first position towards the second position and in a second orientation with respect to the sensor window pane when moved back from the second position towards the first position, which second orientation is tilted with respect to said first orientation.

8. The cleaning unit according to claim 1,
wherein said cleaning unit is arranged for retracting the wiper from the sensor window pane, said cleaning unit further being arranged to move the wiper from the second position back to the first position when the wiper is in a retracted state in which it is not in contact with the sensor window pane,
wherein the cleaning unit is arranged to lift the wiper from the sensor window pane.

9. The cleaning unit according to claim 8, wherein the cleaning unit is arranged to retract the wiper in a direction extending at least partly in a direction parallel to the face of the sensor window pane.

10. The cleaning unit according to claim 9, the cleaning unit being arranged to move the retracted wiper back towards a location near the first position.

11. The cleaning unit according to claim 1, further comprising one or multiple nozzles for spraying a cleaning fluid onto the sensor window pane.

12. The cleaning unit according to claim 11, wherein the one or more nozzles are directed towards said sensor window pane at least when said one or more nozzles are in a spraying state in which the one or more nozzles spray cleaning fluid onto the sensor window pane.

13. The cleaning unit according to claim 11, wherein the one or more nozzles are provided on the wiper and/or on a wiper support carrying the wiper.

14. The cleaning unit according to claim 11, wherein the cleaning unit further comprises a cover for covering at least a portion of the sensor window pane, wherein said cover is movable relative to the sensor window pane, and wherein the one or more nozzles are provided on the cover.

15. The cleaning unit according to claim 1, further comprising a cover for covering at least a portion of the sensor window pane, wherein said cover is movable relative to the sensor window pane.

16. The cleaning unit according to claim 15,
wherein the movable cover includes the wiper and/or a wiper support supporting the wiper; and/or
wherein the movable cover is carried on the wiper and/or a wiper support supporting the wiper.

17. The cleaning unit according to claim 16, arranged such that the wiper or the wiper support can be moved along at least a part the sensor window pane by moving the cover along the sensor window pane.

18. The cleaning unit according to claim 16, wherein the movable cover is provided with a guide arranged for guiding the wiper or a wiper blade of the wiper along the sensor window pane.

19. The cleaning unit according to claim 15, said cleaning unit being arranged to move the wiper independent from moving the movable cover and/or being arranged to move the movable cover independent from moving the wiper relative to the window pane.

20. The cleaning unit according to claim 15, wherein the drive unit arranged for wiping the wiper over the sensor window pane is also arranged for moving the movable cover.

21. The cleaning unit according to claim 20, wherein the drive unit comprises a rotatable drive gear, wherein the wiper is mechanically coupled to said rotatable drive gear to drive the wiper along the sensor window pane when said drive gear is rotated, and wherein the cover is coupled to said the rotatable drive gear by means of a slip coupling,
wherein the cleaning unit is arranged such that when the rotatable drive gear is rotated in a first rotational direction, the drive unit drives the movable cover from the second cover position to the first cover position,
wherein the cleaning unit comprises a first stop surface for cooperation with the cover to prevent the cover from moving beyond said first cover position when being moved from the second cover position to first cover position, and the cleaning unit is arranged such that when the rotatable drive gear is kept rotating in said first rotational direction when the movable cover has reached its first cover position and is being stopped by said first stop surface, the slip coupling allows the rotatable drive gear to keep driving the wiper while the cover is kept in the first cover position by means of the first stop surface, and
wherein the cleaning unit is arranged such that when the rotatable drive gear is being rotated in the second rotational direction, when the cover is in its first cover position, the drive unit drives the movable cover from said first position to the second cover position.

22. The cleaning unit according to claim 21, wherein the cleaning unit comprises a second stop surface for cooperation with the cover to prevent the cover from moving beyond the second cover position when being moved from the first cover position to second cover position,
wherein the cleaning unit is arranged such that when the rotatable drive gear is being rotated in the second rotational direction, when the cover is in its first cover position, the drive unit driving the movable cover from said first cover position to the second cover position also drives the wiper, and
wherein the cleaning unit is arranged such that when the rotatable drive gear is kept rotating in said second rotational direction when the movable cover has reached its second cover position and is being stopped by said second stop surface, the slip coupling allows the rotatable drive gear to keep driving the wiper while the cover is kept in the second cover position by means of said second stop surface.

23. The cleaning unit according to claim 15, wherein the movable cover is rollable.

24. The cleaning unit according to claim 1, wherein the sensor window pane extends upright, wherein the wiper comprises an elongate wiper blade extending horizontally, and wherein the cleaning unit is arranged for wiping a first portion of the wiper over the sensor window pane from a first position towards a second position to wipe at least a first portion of the sensor window pane located between said first position and said second position.

25. The cleaning unit according to claim 24, wherein the cleaning unit is arranged for moving the wiper back from said second position towards said first position without said first portion of the wiper wiping over said first portion of the sensor window pane.

26. An assembly, comprising an optical sensing device including a sensor window pane, the assembly further comprising the cleaning unit according to claim 1.

27. A motor vehicle provided with the cleaning unit according to claim 1.

28. A method for cleaning a sensor window pane of an optical sensing device of a motor vehicle, comprising using the cleaning unit according to claim 1, and wiping at least a first portion of the sensor window pane with the wiper.

29. The method according to claim 28 further comprising wiping the wiper, wherein:
  the wiper is first wiped over the sensor window pane along a first movement route, and
  the wiper is then returned to a first position where the first movement route started, wherein the wiper is not wiping over the sensor window pane when being returned to said first position.

* * * * *